April 3, 1956 A. J. SORENSEN 2,740,939
TESTING DEVICE AND METHOD FOR RAILWAY
TRAFFIC CONTROL APPARATUS
Filed Nov. 19, 1952
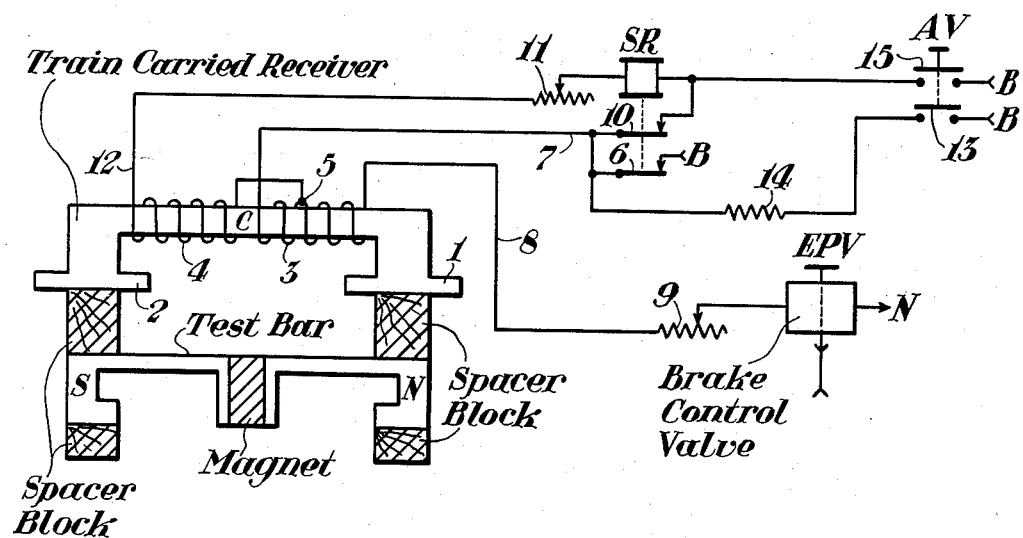
INVENTOR.
Andrew J. Sorensen
BY
W. H. Stout
HIS ATTORNEY

United States Patent Office 2,740,939
Patented Apr. 3, 1956

2,740,939

TESTING DEVICE AND METHOD FOR RAILWAY TRAFFIC CONTROL APPARATUS

Andrew J. Sorensen, Edgewood, Pa., assignor to Westinghouse Air Brake Company, Wilmerding, Pa., a corporation of Pennsylvania Application November 19, 1952, Serial No. 321,403

7 Claims. (Cl. 324—158)

My invention relates to a testing device and method for railway traffic control apparatus. More particularly, my invention deals with a testing device and a testing method using this device adapted for use with apparatus of the type known as intermittent inductive train control apparatus.

Intermittent train control apparatus consists in part of a train-carried receiver with a magnetizable core having two spaced poles and carrying two electrical windings, normally energized. Said windings are part of circuit means which also include a stick relay, an acknowledging valve or switch, and the magnet winding of an electropneumatic valve which controls the automatic application of the train brakes. The wayside apparatus consists of inductors located at intervals along the track, usually at or near a wayside signal. These inductors comprise a magnetizable core having thereon a winding. Each such core is of a size and shape similar to the core of the train-carried receiver, and is so located along the track that it will bridge the poles of the train-carried receiver core during a brief interval as the train passes the wayside inductor. The air gap between the two cores during this brief period of bridging is small, on the order of about two inches. The winding of each wayside inductor core is open circuited or short circuited in response to the track conditions ahead. In normal practice, when two or more signal blocks in advance are unoccupied, that is, the wayside signal displaying a clear or proceed indication, the winding of the inductor is short circuited by contacts of the signal control relay. This minimizes the magnetic effect of the inductor upon the receiver, due to the counterelectromotive force induced in the inductor winding as the energized receiver passes over it. When only one signal block in advance is unoccupied, that is, with the signal displaying a caution indication, or when the next block is occupied, that is, with the signal at stop; the inductor winding is open circuited. This causes the magnetic effect of the inductor upon the receiver to be a maximum, due to the absence of any counterelectromotive force in the inductor winding. The magnitude of such magnetic effect upon the train-carried receiver core as it passes over the wayside inductor is the determining factor as to operation or non-operation of the train-carried apparatus to control the speed of the train.

It is desirable to be able to test the train-carried portion of this type of apparatus without having to move the locomotive or car, on which a set may be mounted, past a wayside inductor at a suitable speed. Actually, the usual test is performed while the engine or car is standing in a shop, or on a "ready" track just prior to use. At the present time several such methods of testing are available. However, these testing devices and methods for determining the operating characteristics of a set of engine equipment are principally those using a source of electrical energy to charge a magnetic circuit consisting principally of a magnetizable bar which is affixed to the train-carried receiver, similar to the apparatus and method disclosed in Letters Patent of the United States No. 1,657,493, issued January 31, 1928, to Paul N. Bossart, for Testing Device and Method for Railway Traffic Controlling Apparatus.

These testing devices have a disadvantage in that a source of electrical energy is required. Generally, this requires that the control panel be kept at the source of electrical energy and near the position of the train operator or locomotive engineer in order that certain acknowledging actions may be performed during a test. This requires the use of long wires to connect the test bar, affixed to the train receiver, to the control panel. All of this results in a bulky and somewhat cumbersome test set. It would be a definite advantage to use a testing device which is self-contained in a single unit both as to energy and operation.

An object of my invention, therefore, is to provide means for, and a method of, testing railway traffic control apparatus which does not depend upon an external source of electrical energy.

An additional object of my invention is to provide a testing device for such apparatus which is less bulky than those presently used.

A further object of my invention is to provide a testing device which will give a more uniform result between different units of its type.

A feature of my invention for accomplishing these objects is the provision of a permanent magnet instead of an electrical magnet, mounted within the core of the testing device which is affixed to the train-carried receiver to simulate the wayside inductor.

Other objects and features of my invention will be apparent from the following description taken in connection with the accompanying drawing.

In the accompanying drawing, the single figure is a partly diagrammatic view of one form of testing device embodying my invention, shown in place against the train-carried receiver of a form of the intermittent inductive train control apparatus.

The train-carried apparatus shown in the drawing forms no part of my invention but is necessary in the description in order to understand the features of my invention. It should be understood that the form of train-carried apparatus as shown is merely one form of such apparatus, somewhat simplified for purposes of this description, and the use of my invention is not limited to this one form of such intermittent inductive train control apparatus.

In describing my invention, it is also necessary to include a brief description of the operation of this type of railway traffic control apparatus, in order that the relation between the train-carried apparatus and the test bar of my invention will be understood. As shown in the drawing, the train-carried receiver comprises an easily magnetizable core C having two spaced pole pieces 1 and 2. The receiver core is provided with two windings 3 and 4, with one side of winding 4 being interconnected to a tap 5, which is located at a fixed number of turns from one end of winding 3.

The train-carried apparatus further comprises a stick relay SR, an acknowledging lever or switch AV, here shown for simplicity as a push button with two independent circuits, and an electropneumatic valve EPV. The operation of valve EPV, when its magnet is deenergized, causes an automatic application of the train brakes. When the magnet of this valve is energized, the control of the brakes of the train remains with the operator or engineer. The acknowledging lever or switch permits the operator or engineer to forestall an automatic application of the train brakes when passing a wayside inductor under conditions as described hereinafter.

The train-carried apparatus is provided with a source of direct current energy, not shown on the drawing, but having a positive terminal B and a negative terminal N.

The train-carried apparatus is shown in the drawing in its normal condition, that is, when the train is not passing a wayside inductor. All portions of the train apparatus are energized in the normal condition, and are so indicated. Under these conditions, the magnet of valve EPV receives energy through a circuit running from terminal B of the source, over front contact 6 of relay SR, through wire 7, winding 3 on the core C of the receiver, wire 8, and a portion of adjustable resistor 9, then through the winding of the magnet of valve EPV to the terminal N of the source. With the magnet of valve EPV energized, the control of the train brakes remains with the operator. The current flow in this circuit through winding 3 also energizes the receiver core, and, as described later, since the current flowing in winding 4 is small, most of the magnetic flux in the receiver core is caused by this current in winding 3.

At the same time, relay SR is energized over its stick circuit which passes from terminal B of the source over front contacts 6 and 10, in series, of relay SR, through the winding of relay SR, through a portion of adjustable resistor 11, wire 12, and winding 4 on core C to tap 5 on winding 3, and then through the right-hand portion of winding 3, wire 8, resistor 9 and the magnet winding of valve EPV to terminal N of the source. The magnitude of current flowing through the winding of relay SR is determined by the small difference in potential between terminal B at contact 6 of relay SR and tap 5 of winding 3, due to the resistance drop in the portion of winding 3 to the left of tap 5 in the drawing. Thus, relay SR has only a limited energization and is very sensitive to any counterelectromotive force generated in winding 4 which occurs, as will be explained hereinafter, when the receiver passes over a wayside inductor.

Each wayside inductor, as previously described, is provided with a magnetizable core which carries a winding known as the nullifying winding. When two or more track sections next in advance to the inductor are unoccupied, this nullifying winding is short circuited, usually by contacts of a signal control relay, but when either of these two track sections is occupied, the winding is open circuited. The design of the inductor core is such that it bridges the poles 1 and 2 of the train-carried receiver core during the brief period when the receiver passes over the inductor. As the receiver core passes over the inductor core, the magnetic effect of the inductor upon the receiver is such as to tend to increase the magnetic flux in the receiver core, which, as described previously, is a normally energized electromagnet. The magnitude of the magnetic effect of the inductor upon the receiver depends entirely on whether the winding of the inductor is short or open circuited. If the winding is short circuited, an electromotive force is induced in this winding upon the approach of the energized electromagnet in the receiver. This induced electromotive force reduces to a minimum the magnetic effect of the inductor core upon the receiver core, and little increase in magnetic flux in the receiver core occurs. Conversely, when the winding is open circuited, the magnetic effect of the inductor upon the receiver is at a maximum, and the increase in magnetic flux in the receiver core is large. For purpose of this description, the speed of the train may be ignored, as the resulting action is the same for all usual train speeds.

By Lenz law, any increase in magnetic flux in the receiver core produces an electromotive force in winding 4 in the direction to oppose the increase of flux. By using the well-known relation between the direction of an electric current in a winding and the direction of the resultant magnetic flux, it is seen that this induced electromotive force will be of such direction as to tend to make current flow from winding 4 in the circuit passing through wire 12, resistor 11, winding of relay SR from left to right, over front contact 10 of relay SR, through wire 7, the left-hand portion of winding 3 to tap 5, and back to winding 4.

Since the train-carried apparatus is normally energized, the electromotive force induced in winding 4 of the receiver will thus oppose the flow of the normal energizing current in the winding of relay SR. If the winding of the inductor is open circuited (a "stop" inductor), the induced electromotive force will be great enough to reduce the current sufficiently to cause relay SR to release. Release of relay SR opens its front contacts 6 and 10. This deenergizes the magnet of valve EPV and the resultant release of this valve causes an automatic application of the train brakes. However, if the winding of the wayside inductor is short circuited (a "clear" inductor), the induced electromotive force in winding 4 of the receiver is not sufficient to cause the release of relay SR and thus no braking action occurs.

If, as a train passes a stop inductor, the engineer operates the acknowledging valve or switch, energy is supplied to prevent the release of the valve EPV and to immediately pick up relay SR. Referring to the drawing, operation of the acknowledging switch AV supplies energy through a circuit passing from terminal B of the source over contact 13 of switch AV, through resistor 14, wire 7, through winding 3, wire 8, resistor 9, and finally through the winding of magnet of valve EPV to terminal N of the source. The valve EPV is thus prevented from releasing. This action forestalls the automatic application of the train brakes while the acknowledging valve is operated.

At the same time, relay SR is reenergized by current flowing through the circuit from terminal B of the source over contact 15 of switch AV, through the winding of relay SR, resistor 11, wire 12, and winding 4 to tap 5, and then through the right-hand portion of winding 3, wire 8, resistor 9, and winding of the magnet of valve EPV to terminal N of the source. Resistor 14, part of the energizing circuit just described for the magnet of valve EPV, is in series with the left-hand portion of winding 3, and thus provides a greater voltage drop between terminal B and tap 5 of winding 3 for the energization of relay SR than is normally provided, so that relay SR will pick up quickly. Thus as soon as the train has passed the "stop" inductor, if the engineer has operated the acknowledging valve or switch, the relay SR picks up. Since relay SR will remain up because of its stick circuit, the apparatus returns to normal when the engineer releases the acknowledging valve.

In the testing of the engine-carried apparatus it is very often desirable, as previously mentioned, to be able to perform the tests without moving the locomotive or car past a wayside inductor at a suitable speed. In order to permit this stationary testing of the equipment, I provide a bar of magnetizable material in which is placed or mounted a permanent magnet so that one end of the bar will assume the magnetic polarity N and the other end of the bar will assume the magnetic polarity S. One form of such a test bar is shown in the lower left-hand portion of the accompanying drawing. The permanent magnet is shown mounted in the center of this bar. In the drawing the right-hand end of the bar is assumed to be the N pole, and the left end the S pole. On each of two sides of the test bar are permanently affixed two spacer blocks made of a nonmagnetic, nonconducting material, such as wood. While it is preferable that the spacer blocks be nonconducting as well as nonmagnetic, this is not a critical factor. The material used may have nonmagnetic characteristics only, such as the metal brass. The thickness of one pair of these spacer blocks is greater than that of the other pair. In the drawing, the spacer blocks are shown affixed at the ends of the test bar with the pair of blocks of greater thickness on the upper side, those with the lesser thickness on the lower side. It should be understood that the shape and form of the test bar and the spacer blocks as shown in the drawing are for illustration only. The actual form of any test bar and the location and shape of the permanent magnet and spacer blocks will vary depending on the actual type of railway traffic control equipment to be tested.

For testing, the test bar is placed across the pole pieces 1 and 2 of the receiver core with like magnetic poles adjacent, that is, N to N, and S to S. By applying the right-hand rule relation to the energized electromagnet of the receiver shown in the drawing, the magnetic polarity N appears at pole 1, magnetic polarity S at pole 2. Therefore, the test bar has been placed in the drawing with its pole N beneath pole 1 of the train receiver core and its pole S beneath pole 2 of the train receiver core. The spacer blocks of greater thickness are shown between the test bar and the train receiver core with the blocks immediately adjacent the pole pieces.

With the test bar thus placed against the train receiver, a magnetic flux is induced in the core of the train receiver by the permanent magnet, which opposes the flux resulting from the current in the windings. The resultant flux in the core of the train-carried receiver is then lower than is the flux under normal conditions. If, then, the test bar is physically and suddenly removed to a remote position away from the train receiver, an increase in flux is produced in the receiver core similar to that increase caused by the passage of the receiver over a wayside inductor. This increase in flux causes an electromotive force to be produced in winding 4 which tends to oppose the increase in flux, as described previously.

By adjusting the strength of the permanent magnet and by the selection of the proper thicknesses for the spacer blocks, conditions of flux density similar to those produced when the receiver passes over a "clear" and a "stop" inductor can be duplicated. The use of the spacer blocks of greater thickness between the train receiver and the test bar is the equivalent of a "clear" inductor. Placing the spacer blocks of the lesser thickness against the receiver simulates a "stop" inductor.

If the relay SR is adjusted to give proper operation of the control apparatus, it should release when the test bar is suddenly removed away from the train receiver if the spacer blocks of the lesser thickness were against the receiver. Conversely, the relay SR should hold up if the spacer blocks of greater thickness were between the train receiver and the test bar before the removal of the test bar.

Since the test bar herein discussed would have considerable reluctance due to the use of the permanent magnet, this test bar depends less upon the yoke itself for its magnetic effect upon the receiver and more upon the lines of flux due to the permanent magnet. More uniform results will thus be obtained when using different test bars of this type than are generally expected between different sets of any other currently used test equipment. This greater uniformity is due to the ease and permanency of adjustments made to the permanent magnet to obtain proper levels of operation. Better and closer adjustment of the relay SR can thus be obtained for safe operation of the apparatus.

Although I have herein shown and described only one form of testing device embodying my invention, and only one method using such form, it is understood that various changes and modifications may be made therein within the scope of the appended claims without departing from the spirit and scope of my invention.

Having thus described my invention, what I claim is:

1. A testing device for testing the train-carried receiver of an intermittent inductive train control system comprising a magnetizable bar magnetized by a permanent magnet mounted between the ends of said bar; and two pairs of spacer blocks of nonmagnetic material mounted on opposite sides of said magnetizable bar, each pair having a preselected thickness different from the thickness of the other pair.

2. In combination with a train-carried receiver having a magnetizable core with spaced pole pieces; a magnetizable test bar magnetized by a permanent magnet, and having affixed thereto on opposite sides two pairs of nonmagnetic spacer blocks for spacing the ends of said bar predetermined distances from said pole pieces, one pair of said spacer blocks having a greater thickness than the other pair of said blocks.

3. A test bar for testing train-carried railway traffic control apparatus of the type including a receiver with a magnetizable core having spaced poles and carrying an electrical winding which is normally energized, said receiver being arranged for coaction with trackway inductors having a magnetizable core carrying a winding which may be open circuited or short circuited; said test bar comprising two magnetizable end members secured to a permanent magnet for setting up in said end members a predetermined density of flux lines, and spacer members of nonmagnetic material secured to opposite sides of said test bar and sized to space said test bar at different distances from said train-carried receiver, for different positions of said test bar, when said bar is placed against said receiver core.

4. A method of testing train-carried railway traffic control apparatus of the type including a receiver core arranged for coaction with trackway inductors, the core of each said trackway inductor having a winding which may be open circuited or short circuited; said method comprising reducing the magnetic flux in a magnetic circuit of which said receiver core is a part by use of a permanent magnet; said permanent magnet being placed adjacent to poles of said receiver core; and then suddenly restoring said magnetic flux through said receiver core, to simulate increase in flux during passage of said receiver core over a trackway inductor, by physically removing said permanent magnet to a remote position away from said receiver core.

5. A method of testing train-carried railway traffic control apparatus comprising reducing, by a greater or lesser amount, the magnetic flux normally in a receiver core, of magnetizable material, and carrying a normally energized electrical winding, of said train-carried traffic control apparatus, by placing a permanent magnet of predetermined strength across the poles of said receiver core, with like magnetic poles adjacent, said permanent magnet being spaced away from said receiver core a preselected greater or a preselected lesser distance by spacer blocks of a nonmagnetic material positioned between said permanent magnet and said receiver core; and then suddenly restoring said magnetic flux in said receiver core to its normal value by rapidly removing said permanent magnet away from said receiver core to a relatively remote location to cause operation or nonoperation of said train-carried apparatus according as said reduction of magnetic flux was of said greater or said lesser amount, respectively.

6. A method of stationary testing of train-carried railway traffic control apparatus of the type including a receiver with a magnetizable core having spaced poles and carrying an electrical winding normally energized, said receiver being arranged for coaction with trackway inductors having a magnetizable core with a winding which may be either open circuited or short circuited; said method consisting of reducing the magnetic flux in said receiver core by using a countermagnetic force from a permanent magnet of predetermined strength mounted in a magnetizable test bar which is placed across said poles of said receiver core with like magnetic poles adjacent and with a pair of spacer blocks between said test bar and said receiver core, said pair of spacer blocks being one of two such pairs of blocks, of a nonmagnetic material, which are affixed to opposite sides of said test bar, said pairs of spacer blocks being of two different preselected thicknesses to simulate open and short circuited inductors respectively; and then suddenly building up the magnetic flux in said receiver core, to simulate passage of said receiver over one of said trackway inductors, by physically removing said test bar away from said receiver to a remote position.

7. The method of stationary testing the train carried portion of intermittent inductive train control apparatus which consiss in placing a magnetizable test bar containing a permanent magnet across the poles of the normally energized electromagnetic receiver of said train control apparatus with like magnetic poles adjacent to reduce the amount of magnetic flux in said receiver, and then suddenly removing said test bar to a position remote from said receiver.

References Cited in the file of this patent

UNITED STATES PATENTS

| | | |
|---|---|---|
| 1,851,818 | Drake et al. | March 29, 1932 |
| 2,074,742 | Drake | March 23, 1937 |
| 2,266,358 | De Lanty | Dec. 16, 1941 |
| 2,552,089 | Dionne | May 8, 1951 |
| 2,558,427 | Fagan | June 26, 1951 |